July 6, 1954
W. G. CARTTER
2,682,867
FLOOR FURNACE WITH TUBULAR HEATING ELEMENT
Filed Sept. 11, 1950
4 Sheets—Sheet 1
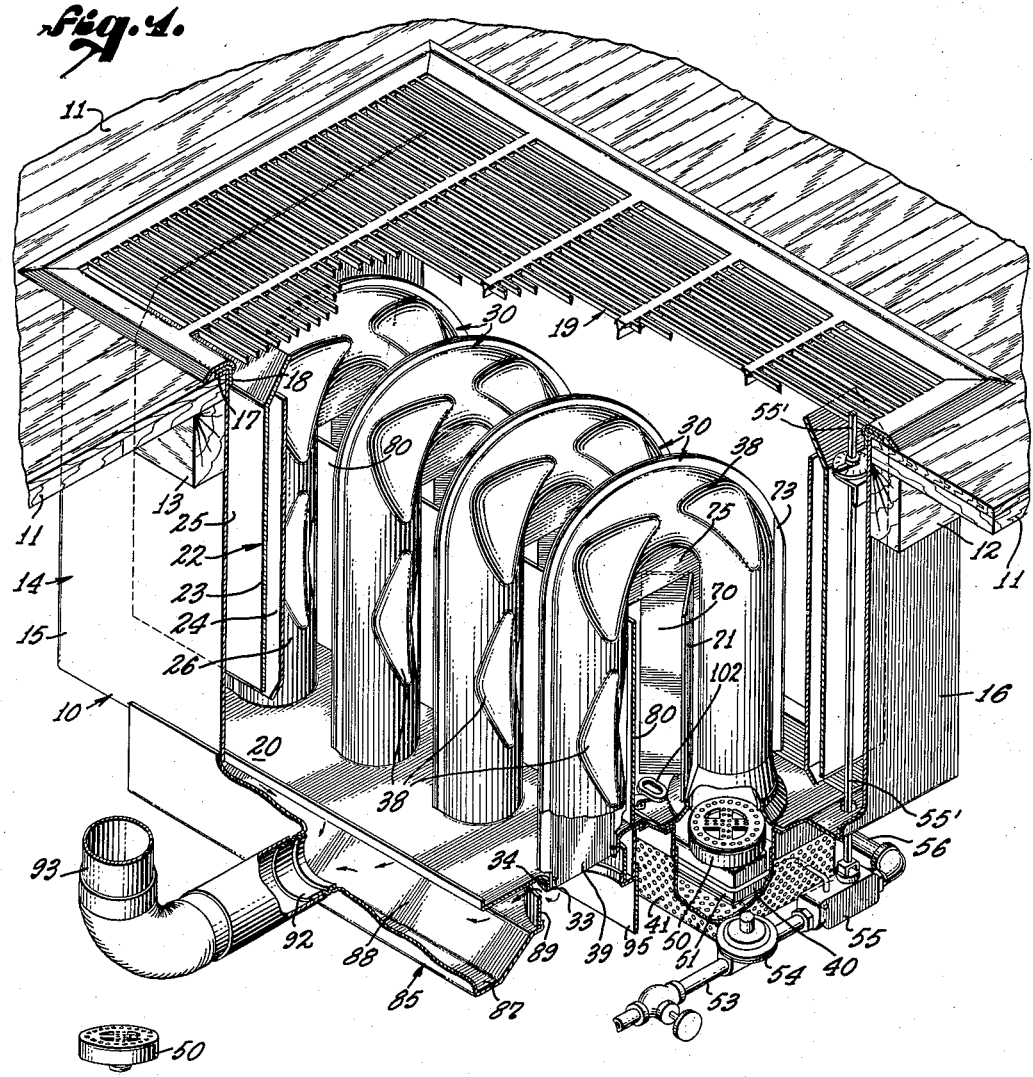
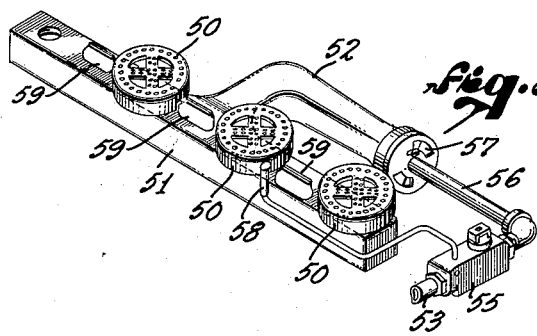
WILLIAM G. CARTTER,
INVENTOR.
HUEBNER, BEEHLER, WORREL
& HERZIG
ATTORNEYS.
BY July 6, 1954   W. G. CARTTER   2,682,867
FLOOR FURNACE WITH TUBULAR HEATING ELEMENT
Filed Sept. 11, 1950   4 Sheets-Sheet 3

WILLIAM G. CARTTER,
INVENTOR.

HUEBNER, BEEHLER, WORREL
& HERZIG
ATTORNEYS.

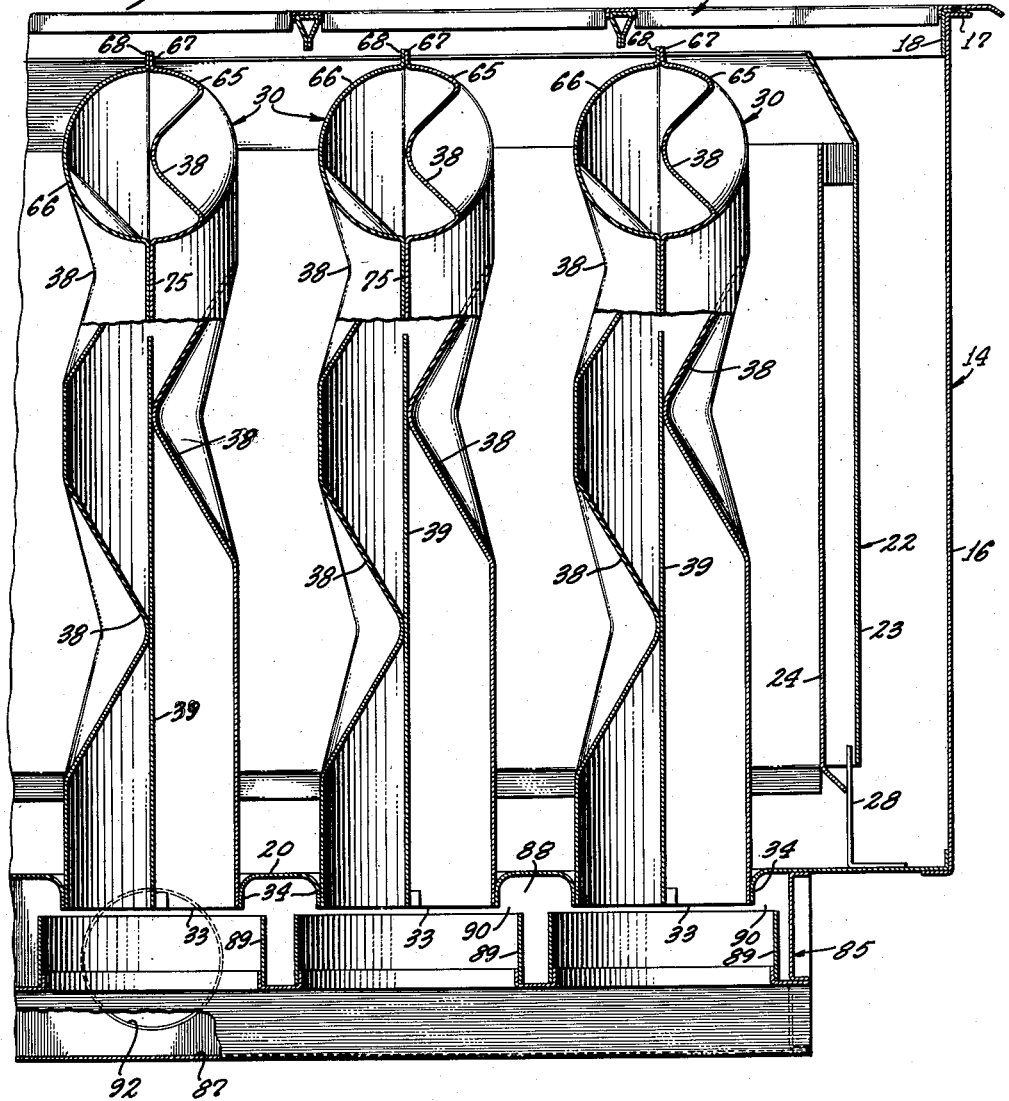

Patented July 6, 1954

2,682,867

UNITED STATES PATENT OFFICE 2,682,867

FLOOR FURNACE WITH TUBULAR HEATING ELEMENT

William G. Cartter, Monrovia, Calif., assignor to Affiliated Gas Equipment, Inc., Cleveland, Ohio, a corporation of Delaware Application September 11, 1950, Serial No. 184,198

10 Claims. (Cl. 126—116)

This invention relates to fuel consuming space heaters and particularly to a new floor furnace construction.

Conventional floor furnaces employ a plurality of relatively large, flat, hollow heating elements or heat radiators mounted within a rectangular metal casing, the latter being surrounded by an outer casing or rough-in box. There is provided a vertical cold air space between the two casings for cold air to flow downwardly, and hot air ascends upwardly through the inner casing, being heated by the radiator elements. In these conventional floor furnaces the outlet for products of combustion crosses the cold air path and the hot gases are vented to a collector box and thence to an external flue pipe or chimney. The collector box for the hot gases is outside the outer casing and consequently outside of the floor opening within which the furnace is mounted.

The several broad, relatively flat, surfaces in the conventional floor furnace tend to confine and reflect the radiant heat back and forth, and it is an object of the invention to provide a furnace of new structural design and improved function which eliminates the old type of heating elements and substitutes a plurality of individual hollow heating elements which may be tubes, each being in the form of an inverted U, whereby the efficiency of the heating elements is increased for a given total area of such elements and a greater freedom for circulation of air is provided.

In the outlets for products of combustion used in the conventional floor furnace, the heat may be in the neighborhood of 500 to 600 degrees F. in the region where the outlet crosses the cold air channel. The result under ordinary operating conditions tends to produce a stalemate, preventing the desired down flow of cold air in the neighborhood of the outlet, and an object of the invention is to eliminate this objectionable feature by taking off products of combustion underneath the lowest extremity of the cold air channels and otherwise avoiding hot air surfaces in the cold air stream.

The conventional floor furnaces are subject to the objection that in case of flooding, water which accumulates in the heating elements usually remains there for a considerable period of time after the flood waters recede, not only preventing operation but tending to rust the parts, and an object of the present invention is to eliminate such an objectionable feature by providing a construction in which there are no pockets to retain flood waters when they recede.

A further object of the invention is to provide a compact floor furnace unit, including down-draft diverters and a collector box for products of combustion, all within the horizontal cross sectional area of the outer casing which is within the vertical planes defined by the opening in the floor, so that the furnace structure may be installed or removed as a unit readily and conveniently; and the safety factor is further increased by positioning of the collector box in a position downwardly removed from the room floor.

An additional object of the invention is to provide a novel floor furnace structure which eliminates the objectionable feature in conventional floor furnaces of noises when the metal expands or shrinks during heating or cooling.

These and additional objects and advantages of the invention will become further apparent from a consideration of the detailed description taken in conjunction with the drawings.

In the drawings,

Figure 1 is a perspective view of the furnace mounted in a floor structure with parts in section.

Figure 2 is a perspective view of the burner assembly employed in the furnace.

Figure 6 is a vertical sectional view taken on the line 6—6 of Figure 4.

Figure 3:
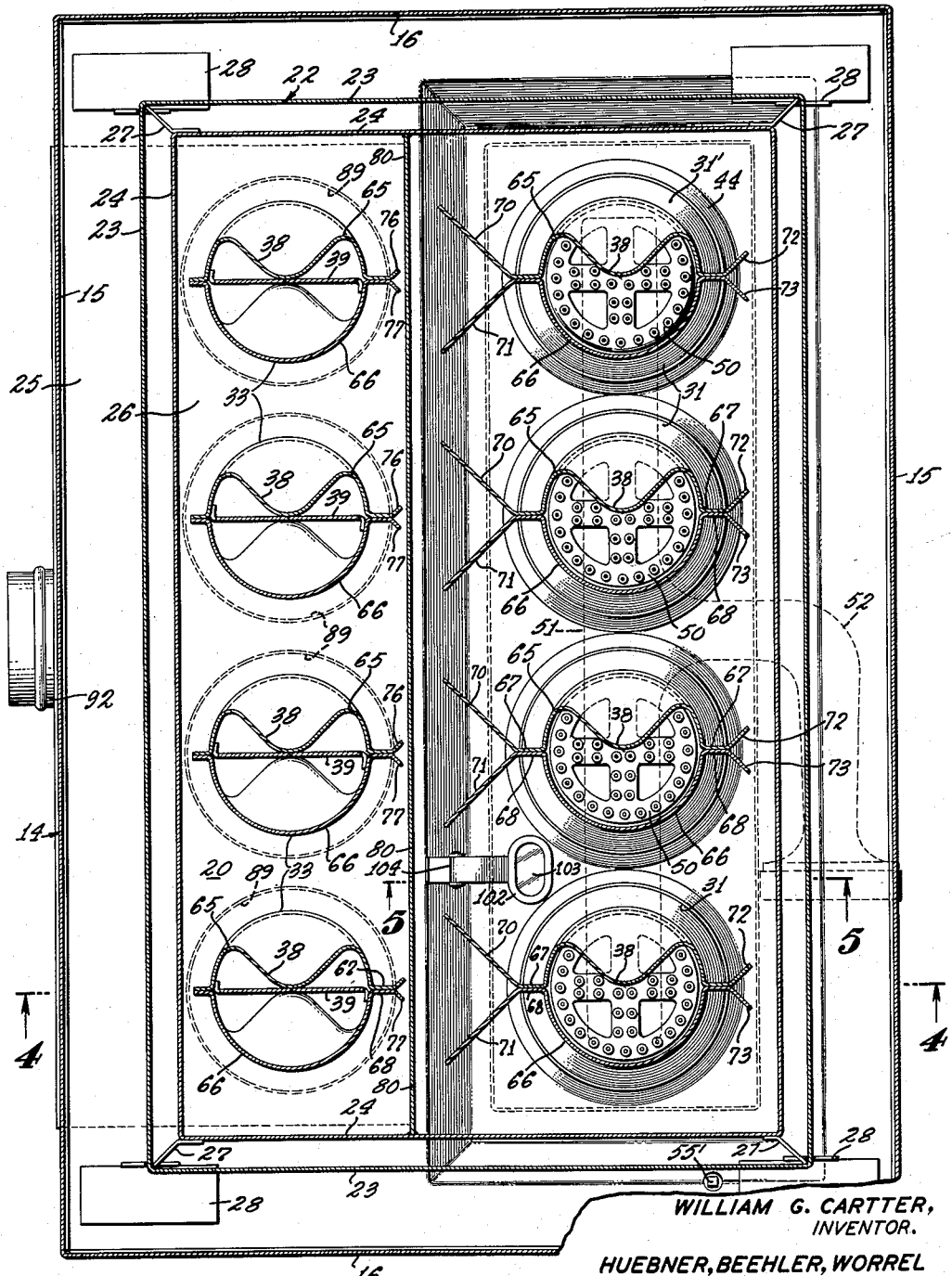
Figure 3 is a horizontal sectional view of the furnace taken on the line 3—3 of Figure 4.
Figure 4:
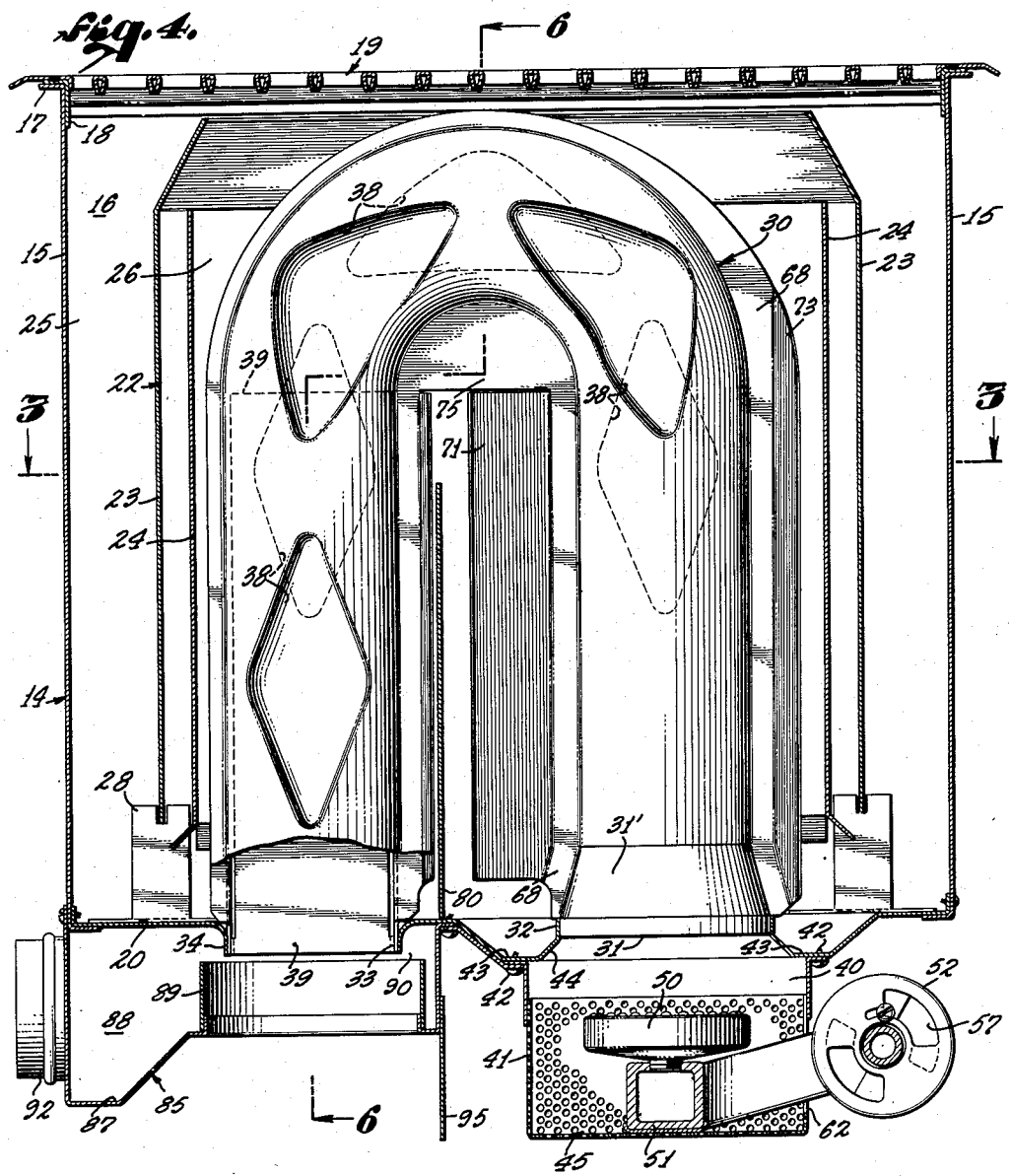
Figure 4 is a vertical sectional view of the furnace taken on line 4—4 of Figure 3 but showing the nearest heating element in elevation.
Figure 5:
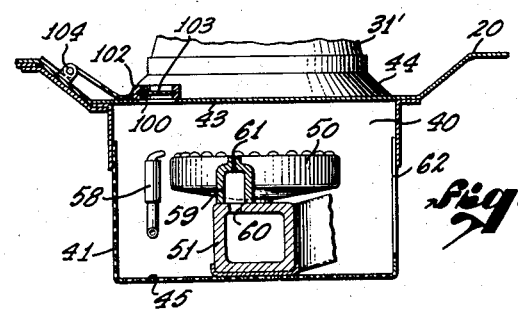
Figure 5 is a fragmentary vertical section taken on the line 5—5 of Figure 3.

The new floor furnace, designated in general by the reference numeral 10, is shown installed through a rectangular opening in a floor 11 and having its main support provided by floor joists 12 and 13.

A rectangular sheet metal casing or rough-in box 14, formed with side walls 15 and end walls 16, is provided at the top with horizontal flanges 17 which may be re-inforced by angular strips 18, the flanges resting upon the upper surface of the floor.

A decorative and protective grill 19 overlies the casing 14. The furnace may be installed with the grill positioned entirely in one room, as illustrated for simplicity, but obviously the grill may be modified or supplemented by conventional dividing elements so that the furnace may be installed in the region of a wall partition so that heat will be supplied to rooms on opposite sides of the wall.

The lower portion of the casing 14 is closed by a bottom 20 which may be secured around the lower edge of the vertical walls 15 and 16. This casing bottom 20 has an irregular configuration which will be described in more detail subsequently.

Spaced inwardly from the wall of the casing 14 is a rectangularly outlined inner casing 22, preferably double walled as illustrated, with an outer wall 23 and an inner wall 24, with upper and lower inclined edges as illustrated. The purpose of the double wall is to increase the thermal insulating capacity, thereby better isolating the cold air channel 25 from the hot air chamber 26. The inner and outer walls 23 and 24 are securely interconnected at the corners by spacers 27, and the assembled inner casing structure is supported upon the outer casing bottom 20 by corner brackets 28. The inner casing 22 is open at the bottom.

The desired air flow is for cold air from the floor region externally of the furnace to flow down the channel 25, pass under the lower end of the inner casing 22 into the hot air chamber 26, where the air is heated and rises therefrom into the room.

The air is heated in the chamber 26 by a plurality of heat exchange or heating elements 30 preferably in the form of hollow tubes, each in the form of an inverted U. The intake end 31 of each tube is preferably flared as indicated at 31' and is mounted as by welding to an annular collar 32 formed in the bottom 20 of the outer casing. The opposite discharge end 33 of each heating tube is supported as by welding in an annular flange 34, also formed in the bottom 20 of the outer casing.

The tubes preferably are provided with indentations 38 staggered on opposite sides so that the interior is partially restricted and a somewhat sinuous path provided for the hot gases traveling through the tubes. Ordinarily, the first indentation will be at considerable elevation above the intake end of the tube because the normal hot spot of the heating tube is in the region of the intake end. Internal baffles 39 are desirable in the downflow legs of the heating elements to further restrict the passage for hot gases.

While the heating elements are illustrated as circular tubes with indentations, baffles being suggested as supplementary, the tubes may be of other cross sectional configuration, as for example, rectangular, triangular, or oblong oval. Moreover, they will operate, though with less degree of efficiency, without any form of restriction whatever.

It is to be noted that the upper portion of the tube 30 is a smoothly curved, inverted U, as opposed to an angular, horizontal passage such as might result from making the two vertical legs terminate at a horizontal, joining header. It is to be further noted that the tube walls are unbroken or impervious, thereby introducing no discontinuities which might produce unwanted turbulence in the gas flow. This construction facilitates smooth turning of the gases from their upflow to their downflow, and simplifies and lowers the cost of fabrication.

No indentations are made in the lower part of the upflow leg because it is desirable that the initial gas rise be rapid and unimpeded so that high kinetic energy is acquired for carrying the gases around the U and down the other leg.

A combustion chamber or burner enclosure 40, provided by an elongated box 41, extends almost the entire length of the outer casing and is axially centered below the heating tubes. The box 41 is preferably perforated for the introduction of secondary air to the burners later described. The box is supported by screws 42 threaded into depressed portions 43 of the casing bottom 20. These depressed portions 43 are linearly co-extensive with the box 41. Conical sections 44 join and support the annular flange collars 32.

Within the combustion chamber 40 is a plurality of gas burners 50 which are mounted upon a manifold 51, distributing gas from a conventional mixing unit 52. The latter derives its fuel supply from a gas line 53 delivering through a pressure regulator 54, through a valve 55, which is operable by a rod 55', and a nipple 56. Primary air is supplied through ports 57.

A pilot 58 is tapped into the valve 55.

Flame carriers 59 are located between adjacent burners for the purpose of spreading flame from one burner to the other when lighting the furnace. Each carrier comprises a hollow nipple extending upwardly from a port 60. The nipple is formed with a longitudinally elongated slit 61 through which a thin sheet of gas rises, which ignites and causes the flame to travel to the next adjacent burner.

The burner assembly, comprising burners, manifold, and closely related parts, may be supported upon the bottom 45 of the box 41. The mixer 52 enters the combustion chamber through an opening 62.

Adjustments or modifications may be made to accommodate the device to the consumption of natural or artificial gas or any one of the so-called bottled gases.

In order to derive the maximum benefit from the inventive concept disclosed, it is preferable to form each heating tube 30 of two mating parts 65 and 66 having complementary flattened joining surfaces 67 and 68 which may be welded together. Extending laterally from the joined surfaces are fins 70 and 71 on one side and fins 72 and 73 on the other side of what may be described as the up-flow leg of the heating tube. The fins 72 and 73 preferably extend at least part way around the bend. The joined flat surfaces 67 and 68 on the inside of the U are preferably of increased width in the arch as indicated at 75, adjacent the upper ends of the fins 70 and 71.

On the down-flow side of the heating tube, fins 77 and 76 are provided along the inner wall of the tube, but because of space limitations will ordinarily be omitted from the outer wall of the tube.

It will be observed that there are three different sizes of fins illustrated. They are all for heat radiating purposes. The size employed in a particular location is primarily controlled by the space which is available according to the design of the furnace as a whole.

It is desirable to employ a longitudinal vertical baffle or partition 80 extending from end to end of the inner casing wall 24 and from the bottom 20 of the outer casing to a point short of the inside bend of the tube. This baffle is preferably offset from a center line, as shown, so that the hot air chamber 26 is subdivided in the lower region into two parts of unequal cross sectional area, the larger area being on the upflow side of the heating tubes. The baffle will retard heat radiation from one leg of the tube to the other.

A collector box and down-draft diverter assembly 85 is disposed adjacent to and below the discharge ends 33 of the heating elements. The assembly comprises a collector box 87 supported from and nearly as long as the bottom 20 of the outer casing, and it provides a single common collecting chamber 88 for products of combustion discharged from all of the heating elements. The collector box 87 is closed except for a plurality of down-draft collars 89 which are individually concentric to and diametrically larger than the lower end 33 of the heating tubes. A space 90 (which is annular in the form illustrated) is provided between the lower end of each tube and the upper edge of the collar 89. For best results the end 33 of the tube should be slightly elevated from the upper rim of the collar 89, and the annular space 90 must be of sufficient area to freely pass products of combustion therethrough into the collecting chamber 88. The furnace will operate even if the lower end 33 of the tube is below the upper rim of the collar 89.

The inverted U tube form of heating element operates as described, probably because of the fact that the gases are hotter and therefore lighter on the upflow side and cooler and therefore heavier on the downflow side.

It will be noted that the collector box and down-draft diverter assembly are on approximately the same level as the combustion chamber, and that both are wholly included within the horizontal plan outline of the outer casing 14. From the collector box extends an outlet collar 92 to which may be connected a vent pipe 93, the latter being joinable to any suitable flue or stack for conveying upwardly and away the products of combustion. It may be noted that the construction of this furnace permits the location of the vent outlet at a substantially lower level than is possible in a conventional floor furnace with the draft hood mounted on the side of the casing. This feature is desirable in that it permits the vent pipe connection from the heater to a suitable chimney to have a substantially greater extent in an upward direction, thereby reducing the possibility of combustion products spillage at the draft hood. A further advantage of this construction is that the horizontal portion of the outlet is not required to open the path of the incoming cool air flowing down the channel 25, which would result in the down-flowing cool air encountering a hot region and turning back, thereby creating undesirable turbulence and decreasing the air circulation rate.

A vertical shield 95 depends from the inner wall 94 of the collector box parallel to the adjacent wall of the burner chamber box 41 and its lower edge on approximately the same level as the bottom 45 of the last mentioned box. This shield assists in isolating the outlet for products of combustion from the air inlets to the combustion chamber.

It is desirable to provide access to and inspection of the pilot 58 by providing an opening 100 in the top 43 of the box 41, which opening 100 will be normally closed by a weighted valve 102 having a transparent window 103 therein, and swingably supported on a hinge 104.

Operation

Assuming that the pilot 58 is lighted, the gas supply to the burners is established by opening the valve 55 in the conventional manner by applying a standard key, not illustrated, to the upper squared end of the rod 55'. Gas enters the mixing chamber 52 and is supplied therein with primary air through ports 57, and the mixture is distributed through the manifold 51 to the burners 50. A minor fraction of the gas and air mixture enters the carriers 59 and assures a communication of flame from the first burner lighted, which would be the one nearest to the pilot, to the other burners.

Secondary air is supplied to the burners through the perforations in the box 41 or from any suitable substitute or additional openings therein. The products of combustion pass upwardly from the combustion chamber 40 into the heating elements 30. While it is preferable to position an individual burner directly below each heating element, this is not absolutely essential, as an elongated single burner or other burner forms may be employed.

The products of combustion travel upwardly through the up-flow legs of the inverted U heating elements, and the indentations tend to somewhat impede the upward flow. These gases pass over the loop in the U and downwardly through the down-flow legs in which the baffles in cooperation with the indentations further impede the flow, and the gases are discharged from the lower ends thereof into the collector box 88, thence through the collar 92 and the pipe 93 into any suitable flue, not illustrated. It is preferable that the flue have a sufficient rise to discharge at an elevation higher than the upper extremity of the heating elements in order to create a good stack condition. The slight vertical separation between the lower ends of the heating element discharge legs and the upper rims of the down-draft collars 89 enable the products of combustion to travel horizontally outward into the collector box. This separation is desirable from an operational standpoint because, if the lower ends of the heating element legs extend downwardly into the collars 89, the hot gases exhausting from the down-flow legs are forced to flow outwardly, thence up and over the upper rims of the collars 89.

It is not absolutely essential to employ the baffles 39, but some efficiency of heat distribution is accomplished by utilizing the baffles in the down-flow sides of the heating elements. They are not needed in the up-flow sides and in the loops, because the up-flow sides are naturally hotter due to their proximity to the burners, and the indentations are sufficient in the loops to cause the desired contact of hot gases with the walls of the tubes. In the down-flow sides, a more complete contact of the gases (which have relatively cooled off) with the walls of the tubes is assured by the presence of the baffles.

There are substitute forms of partial restriction which may be employed, as for example, transverse baffles on the interior of the heating elements.

Heat emanating from the heating elements is of the infra red character, and such heat is radiated outwardly from the heating elements, the radiating fins increasing the heat distribution.

Relatively cold air travels downwardly through the cold air channels 25 around the lower ends of the walls of the inner casing 22, and thence upwardly through the hot air chamber 26 under the influence of the heat there imparted to the air, and exiting through the upper open end of the inner casing, through the grill, and into the room or area to be heated.

The furnace is turned off by reversing the action on the valve rod 55'.

The gases are hottest immediately above the burner 50. As they rise they acquire kinetic energy, which is retained in large part as they curve downwardly around the smoothly curved U joining the two vertical legs of the tube 30. Thus, it is believed that two factors contribute to the maintaining of gas flow—first, the difference in temperature of the two gas columns on the upflow and downflow legs, respectively, and second the kinetic energy acquired in the swift initial rise of the gases, which is retained as they curve smoothly around the U. Retardation of gas flow, needed in certain measure to effect proper heat transfer to the exterior of the tube 30, is thus controllable completely by the restricting indentations 38, and not left to random angular corners which might result in abnormal hot spots.

In heating up or cooling down, the parts, particularly the heating elements, expand and contract with relatively slight, if any, noise. In the event of flooding, water which may rise into the tubes will readily drain off when the flood subsides.

In case of down draft or flue stoppage, the products of combustion discharging from the lower ends of the heating elements 30 will pass down through the collars 89 and into the surrounding area, and any in-rush of air from the flue through the collector box toward the heating elements will be carried with the products of combustion downwardly through the collars into the same area.

If, in the case of failure of controls or pilot burner, the inverted U tubular type of heat element should become filled with an explosive mixture of gas and air and ignition should be attempted at this time, it may be noted that no explosion of consequence will occur since the lower end of both legs of the U tube element are open to the atmosphere. Moreover, no appreciable damage would occur to the heating element because the U tube elements thave no broad and parallel surfaces to distort or bend from concussion caused by explosion.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having thus described my invention, what I claim as new and desire to secure by Letters Patent is:

1. The combination of an inverted U-shaped hollow heating element adapted to convey hot gases and radiate heat derived from such gases, the lower ends of the legs of said inverted U element being open and disposed at approximately the same level, means forming a combustion chamber subjacent one of such openings, a burner in said chamber, means forming a collector box for products of combustion subjacent the other of said openings and approximately on the same level as the means forming the combustion chamber, said box having a bottom opening aligned with, and at least substantially as large as, said other opening, vent means communicating with said collector box for evacuating said products therefrom, and a downdraft collar supported in said collector box aligned with said other opening and having its upper end closely adjacent thereto, whereby under normal draft condition products of combustion travel from said other opening past the upper portion of said downdraft collar for venting from the collector box and in case of a flue stoppage or downdraft the products of combustion may pass downwardly and outwardly through the downdraft collar.

2. In a floor furnace adapted to be installed in the floor of a building comprising an outer casing, and an inner casing providing a heated air chamber whereby vertical channels are formed between the two casings for the down flow of relatively cold air which circulates under the lower edge of the inner casing and flows upwardly therethrough and therefrom when heated, the novel structure which comprises a plurality of hollow tubular heating elements in the inner casing each being in the form of a loop with terminal end portions opening downwardly, a gas burner subjacent one of said openings of each heating element, collector means for products of combustion in the region of the other of said openings of each heating element, the bottom of said collector means having openings at least substantially as large as the openings of said terminal end portions and communicating with the region beneath the furnace, said collector means openings being disposed directly under said terminal end portions, whereby to provide free downward access from each element in the event of back draft or explosion, and vent means communicating with said collector means for evacuating said products.

3. In a floor furnace adapted to be installed in the floor of a building comprising an outer casing, and an inner casing providing a heated air chamber whereby vertical channels are formed between the two casings for the down flow of relatively cold air which circulates under the lower edge of the inner casing and flows upwardly therethrough and therefrom when heated, the novel structure which comprises a plurality of hollow tubular heating elements in the inner casing, each such element being in the form of a loop with terminal end portions opening downwardly, means forming a combustion chamber common to one of said openings of each heating element, burner means in said combustion chamber, and collector means for products of combustion in the region of the other of said openings of each heating element and common to the plurality thereof and provided with a single vent outlet, the bottom of said collector means having openings at least substantially as large as the openings of said terminal end portions and communicating with the region beneath the furnace, said collector means openings being disposed directly under said terminal end portions, whereby to provide free downward access from each element in the event of back draft or explosion, and vertical wall means disposed between the bottom openings of said collector means and said outlet, and extending upward from the bottom of said collector means to a region spaced from the top thereof.

4. In a floor furnace adapted to be installed in the floor of a building comprising an outer casing, and an inner casing providing a heated air chamber whereby vertical channels are formed between the two casings for the downflow of relatively cold air which circulates under the lower edge of the inner casing and flows upwardly therethrough and therefrom when heated, the novel structure which comprises a plurality of hollow tubular heating elements in the inner casing, each such element being in the form of a loop with terminal end portions opening downwardly, said elements being arranged in parallel relation with the corresponding terminal end portions aligned, means forming a combustion chamber common to the aligned openings on one side of the heating elements, burner means in said combustion chamber, and collector means for products of combustion common to the aligned openings on one side of the heating elements, burner means in said combustion chamber, and collector means for products of combustion common to the aligned openings on the other side of the heating elements and provided with a single vent outlet, the bottom of said collector means having openings at least substantially as large as the openings of said terminal end portions and communicating with the region beneath the furnace, said collector means openings being disposed directly under said terminal end portions, whereby to provide free downward access from each element in the event of back draft or explosion.

5. In a floor furnace comprising an outer casing, and an inner casing providing a heated air chamber whereby vertical channels are formed between the two casings for the down flow of relatively cold air which circulates under the lower edge of the inner casing and flows upwardly therethrough and therefrom when heated, the novel structure which comprises a plurality of hollow tubular heating elements in the inner casing, each such element being in the form of a loop with terminal end portions opening downwardly, said elements being arranged in parallel relation with the corresponding terminal end portions aligned, means forming a combustion chamber common to the aligned openings on one side of the heating elements, burner means in said combustion chamber, and collector means for products of combustion common to the aligned openings on the other side of the heating elements and provided with a single vent outlet, said collector means comprising a box, and a plurality of downdraft collars corresponding to the heating elements mounted in said box each in axial alignment with a corresponding contiguous heating element opening and of cross-sectional area at least substantially as large as the area of such opening and closely adjacent thereto, said collars being open at both ends.

6. In a floor furnace comprising an outer casing, and an inner casing providing a heated air chamber whereby vertical channels are formed between the two casings for the down flow of relatively cold air which circulates under the lower edge of the inner casing and flows upwardly therethrough and therefrom when heated, the novel structure which comprises a plurality of hollow tubular heating elements in the inner casing, each such element being in the form of a loop with terminal end portions opening downwardly, said elements being arranged in parallel relation with the corresponding terminal end portions aligned, means forming a combustion chamber common to the aligned openings on one side of the heating elements, burner means in said combustion chamber, and collector means for products of combustion common to the aligned openings on the other side of the heating elements and provided with a single vent outlet, said collector means comprising a box, and a plurality of downdraft collars corresponding to the heating elements mounted in said box each in axial alignment with a corresponding contiguous heating element opening and of cross-sectional area at least substantially as large as the area of such opening and closely adjacent thereto, said collars being open at both ends, the upper ends of the downdraft collars being spaced downwardly from said openings.

7. In a floor furnace comprising an outer casing, and an inner casing providing a heated air chamber whereby vertical channels are formed between the two casings for the down flow of relatively cold air which circulates under the lower edge of the inner casing and flows upwardly therethrough and therefrom when heated, the novel structure which comprises a plurality of hollow tubular heating elements in the inner casing, each such element being in the form of a loop with terminal end portions opening downwardly, means forming a combustion chamber common to one of said openings of each heating element, said means forming the combustion chamber comprising a box perforated throughout substantially all of its wall area for admission of air, burner means in said combustion chamber, collector means for products of combustion in the region of the other of said openings of each heating element and common to the plurality thereof and provided with a single vent outlet, and a vertical baffle between said box and said collector means and extending down substantially to the level of the bottom of said box.

8. In a floor furnace comprising an outer casing, and an inner casing providing a heated air chamber whereby vertical channels are formed between the two casings for the down flow of relatively cold air which circulates under the lower edge of the inner casing and flows upwardly therethrough and therefrom when heated, the novel structure which comprises a plurality of hollow tubular heating elements in the inner casing, each such element being in the form of an inverted U with terminal end portions opening downwardly on approximately the same level, means forming a combustion chamber common to one of said openings of each heating element, a burner in said chamber directly below each opening, a collector box for products of combustion in the region of and common to the other of said openings of each heating element and provided with a single vent outlet, and a downdraft collar open at both ends and disposed in said collector box directly below each opening and being of cross-sectional area at least substantially as large as the area of such opening.

9. In a floor furnace adapter to be installed in the floor of a building, a plurality of tubular heating elements arranged in parallel relation, each in the form of an inverted U with corresponding terminal end portions aligned and opening downwardly and having direct access to the region beneath the furnace, burner means disposed beneath one set of aligned terminal openings, and a collector box disposed beneath the other set of aligned terminal openings, the bottom of said box being open directly beneath each opening of said elements whereby to provide unobstructed access to the region beneath the furnace from each element in event of explosion or downdraft, said box having a single vent outlet adapted to be connected to a flue.

10. In a floor furnace adapted to be installed in the floor of a building, a plurality of tubular heating elements arranged in parallel relation, each in the form of an inverted U with corresponding terminal end portions aligned and opening downwardly and having direct access to the region beneath the furnace, burner means disposed beneath one set of aligned terminal openings, and a collector box disposed beneath the bottom of said box being open directly beneath each opening of said elements thus forming completely unobstructed vertical passage means downwardly over the entire cross-sectional area of said openings whereby to provide unobstructed access to the region beneath the furnace from each element in event of explosion or downdraft, said box having a single vent outlet in a side wall thereof paralleling said other set of aligned terminal openings, and upright baffle means disposed in said box between said other set of openings and said outlet and extending from the bottom of said box to a region spaced from the top of said box and effective to provide a restriction to aspirate combustion products from said elements.

References Cited in the file of this patent

UNITED STATES PATENTS

| Number | Name | Date |
|---|---|---|
| D. 45,757 | Kirkwood | May 12, 1914 |
| 931,422 | Henzel | Aug. 17, 1909 |
| 1,334,005 | Ward | Mar. 16, 1920 |
| 1,451,609 | Cain | Apr. 10, 1923 |
| 1,566,977 | Schmitt | Dec. 22, 1925 |
| 1,591,889 | Schmitt | July 6, 1926 |
| 1,725,988 | Leach | Aug. 27, 1929 |
| 1,991,704 | Schellhammer | Feb. 19, 1935 |
| 2,289,759 | Denise | July 14, 1942 |
| 2,410,881 | Hunter | Nov. 12, 1946 |
| 2,514,372 | Cartter | July 11, 1950 |